US010704972B2

(12) United States Patent
Lassche

(10) Patent No.: US 10,704,972 B2
(45) Date of Patent: Jul. 7, 2020

(54) METHOD FOR MEASURING A LOAD ON A TOWING HOOK AND A TOWING HOOK ARRANGEMENT

(71) Applicant: Brink Towing Systems B.V., Staphorst (NL)

(72) Inventor: Teunis Lassche, The Hague (NL)

(73) Assignee: BRINK TOWING SYSTEMS B.V., Staphorst (NL)

( * ) Notice: Subject to any disclaimer, the term of this patent is extended or adjusted under 35 U.S.C. 154(b) by 159 days.

(21) Appl. No.: 16/074,927

(22) PCT Filed: Feb. 23, 2016

(86) PCT No.: PCT/EP2016/053779
§ 371 (c)(1),
(2) Date: Aug. 2, 2018

(87) PCT Pub. No.: WO2017/144084
PCT Pub. Date: Aug. 31, 2017

(65) Prior Publication Data
US 2019/0033150 A1     Jan. 31, 2019

(51) Int. Cl.
*G01L 5/13* (2006.01)
*B60D 1/06* (2006.01)
(Continued)

(52) U.S. Cl.
CPC ............... *G01L 5/136* (2013.01); *B60D 1/06* (2013.01); *B60D 1/485* (2013.01); *B60D 1/58* (2013.01);
(Continued)

(58) Field of Classification Search
CPC . B60D 1/58; B60D 1/06; B60D 1/485; B60D 1/62; G01L 1/10; G01L 1/25;
(Continued)

(56) References Cited

U.S. PATENT DOCUMENTS 9,056,535 B2 * 6/2015 Materna ............... B60D 1/62
9,464,953 B2 * 10/2016 Wirthlin ............... G01L 1/2243
(Continued)

FOREIGN PATENT DOCUMENTS

EP   2 316 669 A1   5/2011
EP   2 567 837 A1   3/2013

OTHER PUBLICATIONS

International Search Report for corresponding International Application No. PCT/EP2016/053779 dated Oct. 21, 2016.
(Continued)

*Primary Examiner* — Jonathan M Dunlap
(74) *Attorney, Agent, or Firm* — Renner, Otto, Boisselle & Sklar, LLP

(57) ABSTRACT

A method for measuring the applied load on a towing hook/or a tow bar accessory of a towing hook arrangement for a vehicle, and a towing hook arrangement for a vehicle. The towing hook arrangement comprises a towing hook and/or a tow bar accessory arranged on a tow bar, the towing hook arrangement also comprises a sensor arrangement having at least one actuator and at least one sensor, the sensor arrangement is adapted to detect an imparted vibration on the tow bar and use the detected imparted vibration to determine the applied load on the towing hook and/or the tow bar accessory.

37 Claims, 11 Drawing Sheets

(51) Int. Cl.
*B60D 1/48* (2006.01)
*B60D 1/62* (2006.01)
*B60D 1/58* (2006.01)
*G01L 1/10* (2006.01)
*G01L 1/25* (2006.01)
*G01L 5/00* (2006.01)

(52) U.S. Cl.
CPC .................. *B60D 1/62* (2013.01); *G01L 1/10* (2013.01); *G01L 5/13* (2013.01); *G01L 1/25* (2013.01); *G01L 1/255* (2013.01); *G01L 5/0028* (2013.01)

(58) Field of Classification Search
CPC ....... G01L 1/255; G01L 5/0028; G01L 5/136; G01L 5/13
See application file for complete search history.

(56) References Cited

U.S. PATENT DOCUMENTS

| | | | |
|---|---|---|---|
| 9,981,512 B2* | 5/2018 | Gentner | ................... B60D 1/06 |
| 10,406,872 B2* | 9/2019 | Scheips | ..................... G01L 1/14 |
| 10,479,151 B2* | 11/2019 | Brinkmann | .............. B60D 1/06 |
| 10,543,725 B2* | 1/2020 | Hall | .................. G06K 19/06037 |
| 2007/0006652 A1 | 1/2007 | Weldon, Jr. et al. | |
| 2008/0011091 A1 | 1/2008 | Weldon, Jr. | |
| 2013/0080078 A1* | 3/2013 | Wirthlin | ................ G01L 1/2243 |
| | | | 702/42 |
| 2013/0091962 A1 | 4/2013 | Gentner et al. | |
| 2013/0253814 A1* | 9/2013 | Wirthlin | ................. G01G 19/02 |
| | | | 701/124 |
| 2015/0035253 A1* | 2/2015 | Materna | ................... B60D 1/36 |
| | | | 280/477 |

OTHER PUBLICATIONS

Written Opinion of the International Searching Authority for corresponding International Application No. PCT/EP2016/053779 dated Oct. 21, 2016.
International Preliminary Report on Patentability for corresponding International Application No. PCT/EP2016/053779 dated Jun. 22, 2018.

* cited by examiner

METHOD FOR MEASURING A LOAD ON A TOWING HOOK AND A TOWING HOOK ARRANGEMENT

This application is a national phase of International Application No. PCT/EP2016/053779 filed Feb. 23, 2016, which is incorporated herein by reference.

TECHNICAL FIELD

A method for measuring the applied load on a towing hook of a towing hook arrangement, and a towing hook arrangement comprising a towing hook and a tow bar connectable to a vehicle. The method comprises the step of imparting a vibration to the tow bar and detects how the towing hook arrangement reacts to the imparted vibration.

BACKGROUND

Determining the applied load on the towing hook on vehicles has long been a nuisance for vehicle owners. When connecting a trailer to a vehicle and subsequently loading it with a load, such as gravel, timber, furniture or the like, it is difficult to determine whether the amount of load positioned on the trailer supersedes the amount of load permitted by trailer manufacturer. Likewise, it is difficult to know if the amount of load positioned on the trailer imparts the towing hook with a load which supersedes the amount of load permitted by tow bar specifications, trailer specifications or vehicle specifications.

To measure the applied load on a towing hook, strain gauges can be used. Strain gauges are however problematic as they may have thermal, electric drifting and structural integrity problems. They are further not very good to perceive smaller loads on rigid objects. One way to measure load is disclosed in the published US patent application no. US 2008/011091 A1, assigned to Abnaki Systems Inc. The device disclosed in the Abnaki document uses a resonance force sensor and is said to enable measurements on all forms of structural pre-stress, including axial compressive and tensile loading, applied bending moments, applied torsion, gravitational mass loading.

However, the document is insufficient in terms of that it does not disclose how such sensor should be applied to vehicles to measure load.

SUMMARY

It is an object of the present invention to provide for a solution to the above mentioned drawbacks, or to at least reduce the drawbacks, or to provide for a useful alternative. The object is at least partly met by a method for measuring the applied load on a towing hook and/or a tow bar accessory of a towing hook arrangement. The towing hook arrangement comprises a towing hook and/or a tow bar accessory arranged on a tow bar. The towing hook arrangement also comprises a sensor arrangement having at least one actuator and at least one sensor. The method comprises the steps of;

a) imparting a vibration to the tow bar using the at least one actuator;

b) detecting the imparted vibration using the at least one sensor; and c) using the detected imparted vibration to determine the applied load on the towing hook and/or the tow bar accessory.

The method provides a cheap and accurate method for detecting even relatively small amounts of load applied to a towing hook and/or to a tow bar accessory of a towing hook arrangement. The towing hook arrangement may or may not be positioned on a vehicle.

The method may be performed after it has been mounted to a vehicle or before being mounted to a vehicle. If performed before being mounted on a vehicle, data from the at least one sensor may be stored and compared at a later stage when the towing hook arrangement has been mounted to a vehicle. The method may be initiated upon request by a user, e.g. via a vehicle interface, or automatically at start up of the vehicle or at attachment of a towable object such as a trailer, or at attachment of a plug into a socket of the towing hook arrangement such as the plug to a trailer.

By the term "towable object" is hereby meant any object which can be attached to the towing hook such as a trailer, caravan, bike carrier, luggage carrier or the like. Hence the towable object does not necessarily need to be towed, but can simply be carried by the towing hook, yet still be a towable object.

Further, the objects are at least partly met by a towing hook arrangement comprising a towing hook and/or a tow bar accessory and a tow bar connectable to a vehicle. The towing hook and/or a tow bar accessory is attached to the tow bar. The towing hook arrangement further comprises a sensor system for detecting an applied load on the towing hook and/or a tow bar accessory. The sensor system comprising at least one actuator and at least one sensor, the at least one actuator is adapted to impart the tow bar with a vibration, and the at least one sensor is adapted to detect the vibration.

The arrangement provides a cheap and accurate arrangement for detecting even relatively small amounts of load applied to a towing hook of a towing hook arrangement. The towing hook arrangement may or may not be positioned on a vehicle. The towing hook arrangement may be assembled separately with respect to the vehicle and sold as a separate component to the vehicle and as such can be considered as a stand-alone unit. As a stand-alone unit, it may be important to calibrate and perform measurements on the towing hook arrangement even before it is mounted to a vehicle, e.g. before it is sent to a vehicle manufacturer for assembly with the vehicle. The sensor arrangement is a good sensor arrangement for this scenario as well. It should be noted that the applied load may be a positive load or a negative load, e.g. when lifting the towing hook.

By the term "tow bar accessory" is hereby meant at least one of the following; a bike carrier, a luggage carrier, luggage box, winch, sports equipment carrier, building material carrier, or the like. Some towing hook arrangements have replaceable towing hooks which can be replaced with a tow bar accessory such as a bike carrier. Such systems permits a user to replace the towing hook which in that case is connected to the tow bar at a connection site specifically adapted for tow bar accessories, or for one specific accessory.

By the term "towing hook" is hereby meant a connection member which generally has a neck element and a coupling element. The coupling element is generally ball shaped but other shapes of the coupling element may be provided. The coupling element is adapted to be connected to a towable object. The coupling element is preferably arranged at one end of the neck element. The neck element further has an opposing end which is intended to be connected to the tow bar, which in turn is intended to be connected to the rear of a vehicle.

Measurements on towing hooks are generally very difficult as towing hooks by their nature are very exposed to wear due to the connected towable object such as a trailer. Hereafter the method and the arrangement will be described. It should be noted that features described with respect to the method may very well be applicable on the towing hook arrangement and vise verse.

The method may further comprises the step of; determining a set of harmonics of the natural frequency of the tow hook arrangement and using the set of harmonics of the natural frequency of the tow hook arrangement to determine the applied load on the towing hook. The set of harmonics preferably include 2 or more harmonics, such as 2-10, 5-20, 2-20, 2-50, or 5-50 harmonics. The method may optionally or additionally comprise the step of; determining the first or higher harmonic of the natural frequency of the tow hook arrangement and using the determined first or higher harmonic of the natural frequency of the tow hook arrangement to determine the applied load on the towing hook. The change in the first or higher harmonic of the natural frequency may be used for determining the applied load. The determination is preferably done after the towing hook arrangement is mounted to a vehicle. It has been found that very accurate readings may be provided when detecting the first or higher harmonic of the natural frequency of the towing hook arrangement, or the present system, which vary dependent on the applied load to the towing hook. Even relatively small loads applied to the towing hook may be detected. This is very advantageous as towing hook arrangements are very robust by their nature.

At the resonance frequency a damped system oscillates with the highest possible exertion relative to the input source, when an input source with that frequency is provided to the damped system. The maximal exertion at the resonance frequency is determined by the amount of energy that can be stored in the system as vibrational energy; the amount of energy the system loose is determined by the dampening of the system. With an increasing dampening factor the resonance frequency of a damped system decreases; the highest possible resonance frequency possible is therefore when the system has no dampening; this frequency is called the natural or Eigen frequency. For systems with very low dampening like a towing hook arrangement, the resonance frequency is by approximation equal to the natural frequency, therefore when mentioning natural frequency both natural and resonance frequencies preferably apply.

The present invention uses the fact that the amplitude of the natural frequency of the system can be increased via imparting a forced vibration to the system. When the forced frequency is equal to the natural frequency, the amplitude of the vibrations increases sometimes manifold.

The first or higher harmonic of the natural frequency of the tow hook arrangement may be determined by; imparting a vibration to the tow bar when the towing hook and/or the tow bar accessory is load free and; detecting the imparted vibration using the at least one sensor. By load free is meant that no load is positioned on e.g. the towing hook such as a trailer, bicycle carrier, luggage carrier or the like. For the purpose of the tow bar accessory, load free is meant that no load is imparted to the tow bar accessory.

The at least one actuator may be positioned on the tow bar. The at least one sensor may be arranged on the tow bar. It has been found to be advantageous if the at least one actuator and/or the at least one sensor is arranged on the tow bar. This imparts the vibration directly to the tow bar which generates a good transfer of the imparted frequency. It is also advantageous to measure directly on the tow bar as vibrations propagate in the tow bar with low loss. The at least one actuator and the at least one sensor may thus be connected directly onto the tow bar. Preferably they are aligned with respect to each other. It has been found that the tow bar provides good possibilities to align the at least one actuator and the at least one sensor with each other, as the tow bar generally has an elongation and a longitudinal extension. Hence the vibration may be imparted directly onto the tow bar, and the sensor may measure directly onto the tow bar. There may be at least one more actuator than sensor(s) or at least one more sensor than actuator(s).

The towing hook and/or the tow bar accessory may be arranged between the at least one actuator and at least one sensor. Preferably the towing hook and/or the tow bar accessory is positioned between the towing hook arrangements first and second connection members. More accurate measurements are believed to be provided if the towing hook and/or the tow bar accessory is positioned between the at least one actuator and the at least one sensor.

The method may be performed using at least one frequency scan. The frequency scan may be a frequency sweep. By sweep is meant that the actuator generates a vibration within a frequency range going from a low-high, or high-low frequency with continuously increasing or decreasing frequency points. Additionally or alternatively, a fixed number of relatively few frequency points may be used such step may be referred to as a frequency stepwise scan. Such measurement does not necessarily need to be in an increasing or decreasing order. Both of these methods are however considered to be frequency scans.

The at least one actuator may in step a) initiate a first frequency scan and/or sweep and; the method further comprises the step of; performing a second frequency scan and/or sweep. The purpose is to find the first or higher harmonic of the natural frequency of the present system, i.e. of the towing hook arrangement with the specific load taken into account. By scanning through a frequency range, the first or higher harmonic of the natural frequency of the towing hook arrangement may be detected as a peak, a frequency peak. By using individual frequency points, a few measurements may be made, and a the position of the frequency peak may be estimated, and a second frequency scan and/or sweep may be performed to position and measure the frequency peak in a more detailed manner.

The second frequency scan and/or sweep may be different with respect to the first frequency scan and/or sweep. The difference is preferably being a sweep through a different, e.g. smaller frequency range. The second frequency sweep may be performed across a smaller frequency range than the first frequency sweep. The second frequency sweep may be performed with a smaller step size than the first frequency sweep. The smaller frequency range is preferably within the first frequency sweep but overlapping frequency sweeps are also possible. Optionally or additionally; other differences may be that the second frequency sweep, or the subsequent frequency sweep, is done with a higher intensity, smaller step size, a different duty cycle, a larger frequency range, or the like. As such it is easy to see that the method permits any number of different frequency sweeps to be modulated together to perform accurate measurements, or to perform measurements adapted to the specific vehicle to which the towing hook arrangement is assembled with. Frequency sweeps may of course be repeated.

The method may include the step; a first frequency peak is detected from the first frequency sweep, whereby the second frequency sweep is performed across the detected first frequency peak. By adjusting the frequency sweep to the first detected peak, the second frequency sweep can be made with higher accuracy, in the end providing a method giving better readings.

The tow bar may have an attachment section for said towing hook and/or said tow bar accessory arranged between said at least one actuator and at least one sensor. The method may thus comprise the step of that the vibration passes the attachment section before reaching the at least one sensor. In another term, the actuator may be positioned upstream of said attachment section and the sensor may be positioned downstream of the attachment section.

Optionally or additionally, an attachment section for the towing hook and/or said tow bar accessory is arranged at the side of the at least one actuator and the at least one sensor. The vibration is thus directed directly towards the at least one sensor for the purpose of not passing the attachment section before reaching the at least one sensor. In this case the attachment section is arranged upstream of both the actuator and the sensor.

The towing hook may be a retractable towing hook displaceable between a tow position and a retracted storage position. Alternatively, the towing hook may be fixed to the tow bar or be a detachable towing hook. By fixed to the tow bar it is meant that the towing hook is welded or otherwise attached to the tow bar in a manner which does not permit the removal of the towing hook from the tow bar without re-register the towing hook arrangement or in other ways restrict the permitted use of the towing hook arrangement.

The vibration may be imparted to the tow bar when the towing hook is in the storage position and/or the tow position. It may be advantageous to provide reference measurements; as such it is an option to enable a measurement when the towing hook is in the retracted position. When the towing hook is in the retracted position, it may be expected that the towing hook is not imparted with a load; hence it is a very good position at which to perform a zero load measurement.

The sensor arrangement may be adapted to detect or determine a torque imparted to the tow bar. When applying a load to the towing hook, the main force direction is generally in a vertical direction, i.e. downwards. As such the towing hook may impart a rotation to the tow bar, i.e. a torque, especially if the towing hook is positioned between a first and a second connection member of the towing hook at which the towing hook can be connected, or is connected, to the vehicle. It has surprisingly found that the method is applicable also for this kind of imparted stress to the tow bar via the towing hook.

The at least one actuator may be adapted to impart a vibration to the tow bar having a frequency from 10-2000 Hz, preferably from 10-500 Hz, more preferably from 10-200 Hz. The actuator is preferably a low frequency actuator adapted to impart the tow bar with a low frequency. By low frequency is meant frequencies below 500 Hz. It is believed that frequencies above 500 Hz may be more susceptible to other high frequency noise, and even possibly itself be the source for noise. In some occasions it may however be advantageous to impart the tow bar with a high frequency, such as a frequency of 500 Hz or more.

The imparted vibration may correspond to the towing hook arrangements first or higher harmonic of the natural frequency. As such, the imparted vibration may be specifically adapted to find the first or higher harmonic of the natural frequency of the towing hook arrangement, i.e. the system which is measured. This may be done independently of the load applied to the towing hook. Without being bound by theory, it is expected to be a balance between noise at high frequencies and additional parts connected to the tow bar such as a socket, brackets, and vehicle components that hit their own respective natural frequency close to the natural frequency of the tow bar, which determines which harmonic of the natural frequency that is most favorable.

The tow bar may have a longitudinal axis, and the towing hook may be arranged between the at least one actuator and the at least on sensor with respect to the longitudinal axis of the tow bar. It has been found that this give accurate readings. It also provides a relatively low loss or dampening of the imparted vibration.

As mentioned, the tow bar may have a longitudinal axis, the at least one actuator and the at least on sensor may be aligned to each other and with respect to the longitudinal axis of the tow bar. The at least one actuator and the at least one sensor are preferably aligned along an imaginary straight line, preferably so that the center of the actuator and the center of the sensor intersects with the imaginary straight line. This provides a good transfer of the vibration to the sensor with a relatively low loss.

The towing hook may be attached to the tow bar at an attachment section, and wherein the distance from the attachment section to the at least one actuator and/or the at least one sensor is from 2-100 cm, preferably from 5-50 cm.

The distance between the at least one actuator and the at least one sensor may be from 2-200 cm, preferably from 10-80 cm. The towing hook arrangement may be provided with at least one attachment point, preferably two attachment points. The attachment point(s) may be in the form of a connection member. The distance to the connection members, or the attachment point, is preferably measured along the longitudinal axis of the tow bar. According to an aspect, the actuator and the sensor may be positioned in the near proximity of each other, i.e. closer than 2 cm, optionally they may be positioned adjacent each other.

The towing hook arrangement further comprises an electronic control unit and optionally a display unit. The electronic control unit may include; a processing unit (CPU), a signal generator, an amplifier, a converter, a communication unit for internal and/or external communication, and/or a fast Fourier transformer. By internal communication is meant for communication with the vehicle for example, or other parts of the towing hook arrangement. By external communication is meant for communication with servers, mobile phone units, computers, vehicles, or the like outside of the vehicle. The electronic control unit may be the vehicle on-board computer for example, or an electronic control unit arranged to the towing hook arrangement, i.e. a separate electronic unit with respect to the vehicle on-board computer. The display unit may be of various kinds. It is preferred that the display unit is a touch screen from which the electronic control unit may both display and receive data. In its simplest form, the display unit is just an indication signal, e.g. signaling red or green light for example. The towing hook may be operated via the display unit, such as via a mobile phone or touch pad e.g. an ipad, for example.

The towing hook arrangement may comprise additional sensors. At least one sensor may be arranged on the towing hook, preferably on the neck of the towing hook. Such additional sensor may be adapted to operate as supplementary sensors, e.g. detect if the trailer is connected to the towing hook, if a trailer is connected properly to the towing hook. The method may thus have a step; using a supplementary sensor for detecting a secondary parameter, the secondary parameters not being an applied load to the towing hook. The additional sensor may be a temperature sensor, an accelerometer, piezo sensor or the like. The input from the additional sensor may be used to improve the accuracy of the measurements, e.g. as input to the electronic control unit if such is present.

The towing hook arrangement may have at least one attachment point, e.g. a first and a second connection member, adapted to be connected to the vehicle. The at least one actuator and/or the at least one sensor may be arranged between first and the second connection members. The towing hook is also preferably arranged between the first and the second connection members. It has been found that the vibration imparted to the tow bar, can be better measured if the tow bar is suspended to the vehicle via the first and the second connection members, primarily because the tow bar is permitted to vibrate between these so called nodes. An actuator or sensor is preferably not positioned closer to the first and/or the second connection members than 10 cm as it is believed that the regional increase of stiffness that the connection member provides to the tow bar may affect the vibration imparted by the actuator in a negative manner. Likewise, it is believed that the sensor may be negatively affected in the same manner.

The tow bar may comprise one or more temperature sensors. The one or more temperature sensors is preferably positioned so that they measure the temperature between the at least one actuator and the at least one sensor, or at the proximity of the at least one sensors.

The at least one actuator and the at least one sensor are arranged on said tow bar, and preferably the tow bar is made from one unitary piece of material, at least at the section at which the at least one actuator and the at least one sensor is positioned. It is advantageous if the actuator and the sensor are positioned on the same piece of material as it is believed that welds may affect the imparted vibration, and possibly dampen the vibration. Welds or similar, may be affected by temperature changes differently that the tow bar itself. Hence temperature differences may be easier to take into account if the at least one actuator and the at least one sensor are arranged on the same piece of material.

BRIEF DESCRIPTION OF THE DRAWINGS

Non-limiting embodiment of the present invention will be described with reference to the accompanying drawings in which.

DETAILED DESCRIPTION OF PREFERRED EMBODIMENTS

Figure 1:
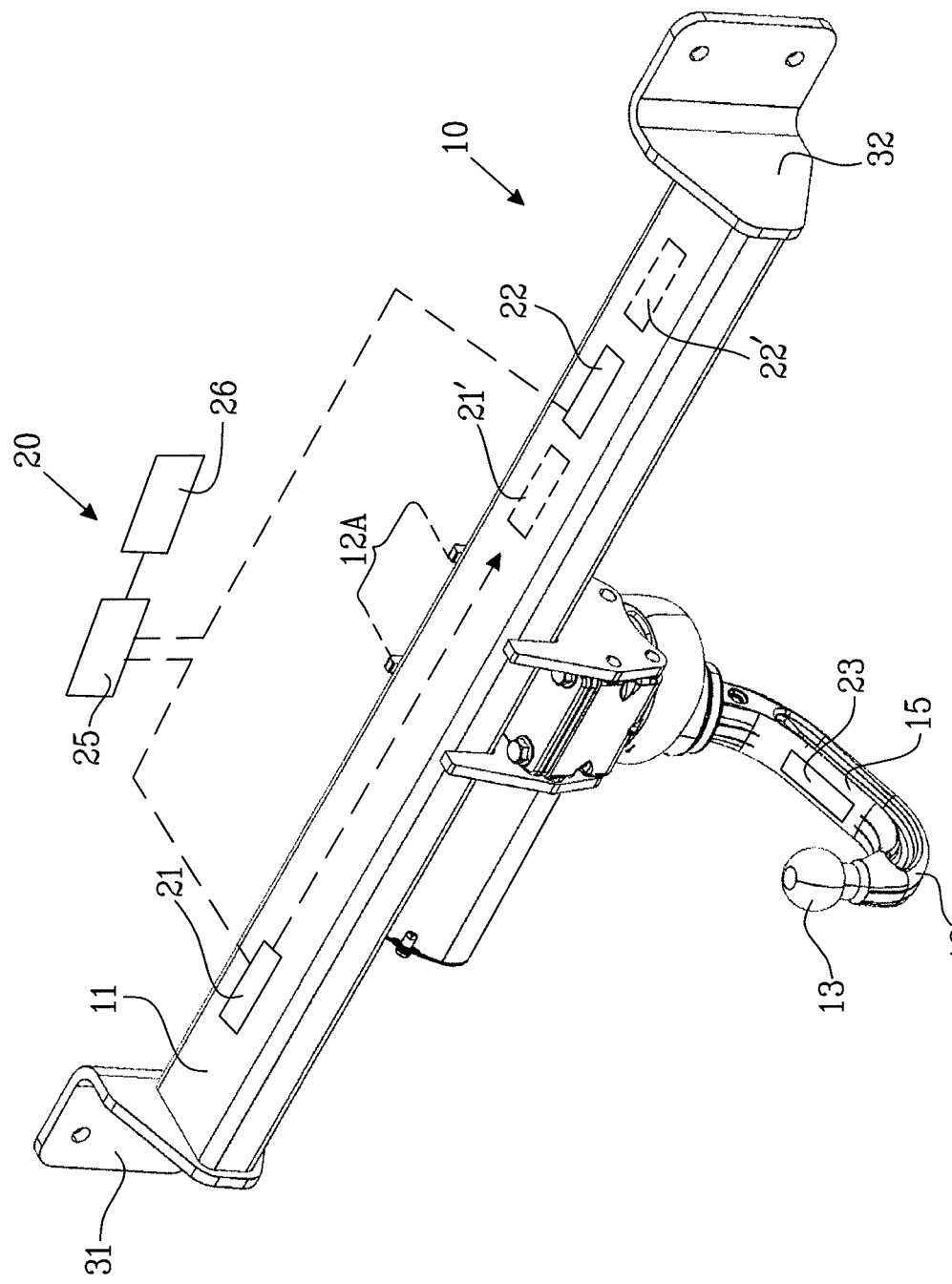
FIG. 1 shows a towing hook arrangement comprising a tow bar and a towing hook, the towing hook being of the retractable type.

FIG. 1 shows a towing hook arrangement 10 adapted to be mounted on a vehicle (not shown) such as a car, lorry, recreational van (RV), all-terrain vehicle (ATV), or similar. The towing hook arrangement 10 comprises a tow bar 11, to which a towing hook 12 is mounted at an attachment section 12A. Although a towing hook is used to describe the present invention herein, it should be noted that a tow bar accessory can be used instead, or in some cases in addition to the towing hook.

A tow bar, such as the tow bars disclosed herein e.g. the tow bar 11, is a supporting element to the towing hook or the tow bar accessory, generally from which the towing hook extends from the vehicle. A tow bar is generally attached to the chassis and preferably at the rear of the chassis and in a transverse direction to the main direction of the chassis. The tow bar preferably has a longitudinal extension generally extending in a transverse direction with respect to the extension of the towing hook and/or a tow bar accessory. The tow bar may be adapted to a specific vehicle while the towing hook and the tow bar accessory are generally standardised.

The towing hook 12 is of a retractable type in terms of that it can be retracted from a tow position, as shown in figure, to a storage position (not shown). When being in the tow position, the towing hook 12 is in a position ready to receive and tow a towable object such as a trailer, bicycle carrier or the like. When being in a storage position, the towing hook 12 is generally concealed from view by a portion of the vehicle to which the towing hook arrangement 10 is mounted. In a storage position, the towing hook 12 is incapable of being connected to a towable object, at least with the purpose to tow the towable object. The towing hook 12 may be displaced via an electrical motor, as shown in FIG. 1, or be manually displaced. The towing hook 12 has a towing ball 13 adapted to be connected with the towable object, a ball joint element 14 and a neck 15 extending between the towing ball 13 and the ball joint element 14. A first and a second connection member 31, 32 are arranged to be coupled to the vehicle by e.g. bolt and nuts, welding or the like.

The towing hook arrangement 10 comprises a sensor arrangement 20. The sensor arrangement 20 is adapted to detect if a load is applied to the towing hook 12 or not. It may additionally or optionally be adapted to determine the amount of load applied to the towing hook 12. It may further be adapted to detect if the towing hook arrangement is incorrectly mounted to the vehicle as will be outlined below. Preferably, the towing hook arrangement 10 is adapted to determine the amount of torque imparted to the tow bar 11 via the towing hook 12 and the load applied to the towing hook 12.

The towing hook arrangement 10, and the sensor arrangement 20, comprises at least one actuator 21 and at least one sensor 22. The actuator 21 is adapted to impart a vibration to the tow bar 11. The vibration may be imparted as a frequency sweep. The actuator 21 excites a band of frequencies around the natural frequency of the tow bar 11. The sensor 22 detects the structural response to the excitation in the band range of excitation. In other words, the vibration is imparted as a forced frequency to the towing hook arrangement 10 which when corresponding to the natural frequency of the towing hook arrangement, i.e. the system itself, will enhance the frequency of the towing hook arrangement in a detectable manner.

As shown in FIG. 1, the actuator 21 and the sensor 22 are arranged on either side of the towing hook 12, or more precisely on either side of the attachment section 12A at which the towing hook 12 is attached to the tow bar 11. It should be noted that the term attachment section includes an individual attachment point or a section formed between two or more attachment points. In the shown embodiment, the towing hook 12 is arranged to the tow bar 11 via an attachment section 12A formed by two attachment flanges which the towing hook 12 and an electrical motor. It has been found however that the specific attachment of the towing hook 12 to the tow bar 11 is of less relevance as the sensor arrangement 20 can be tuned to the specific configuration of the towing hook arrangement 10.

The sensor arrangement 20 may further be provided with an electronic control unit (ECU) and display unit 26. The ECU 25 may comprise a processing unit (CPU), a signal generator, an amplifier, a converter, and/or a fast Fourier transformer if desirable. The sensor arrangement 20 may be directly connected to the vehicles on-board computer if desirable, either to cooperate with an existing ECU, such as the ECU 25, or as a replacement thereof. The at least one actuator 21 and/or the at least one sensor 22 can communicate with the ECU 25 via cords, wireless e.g. via a wireless network. This is indicated in FIG. 1 with dashed lines. Also indicated in FIG. 1 with a dashed arrow is the propagating frequency imparted by the actuator 21 towards the sensor 22.

The towing hook arrangements 10 described herein may be provided with at least one additional sensor 23. The additional sensor(s) may be provided on the towing hook 12 and preferably on the neck 15 of the towing hook 12 or on the tow bar accessory if such is present. The additional sensor 23 can be a temperature sensor, an accelerometer, piezo sensor or the like. The sensor arrangement 20 may thus be provided with additional sensor capacity. Additional sensors may be used as input for providing increased accuracy for example. Other positions of the additional sensor(s) are of course possible, such as on the tow bar 11 for example or in the electrical motor.

FIG. 1 also shows alternative actuator and sensor positions 21', 22', illustrated with dashed lines in FIG. 1. The actuator and the sensor 21', 22' is in this case positioned on the same side with respect to the towing hook 12, and the towing hooks 12 attachment section 12A on the tow bar 11. The attachment section 12A is thus not separating the actuator and the sensor 21', 22' but rather positioned on the side thereof.

Figure 2:
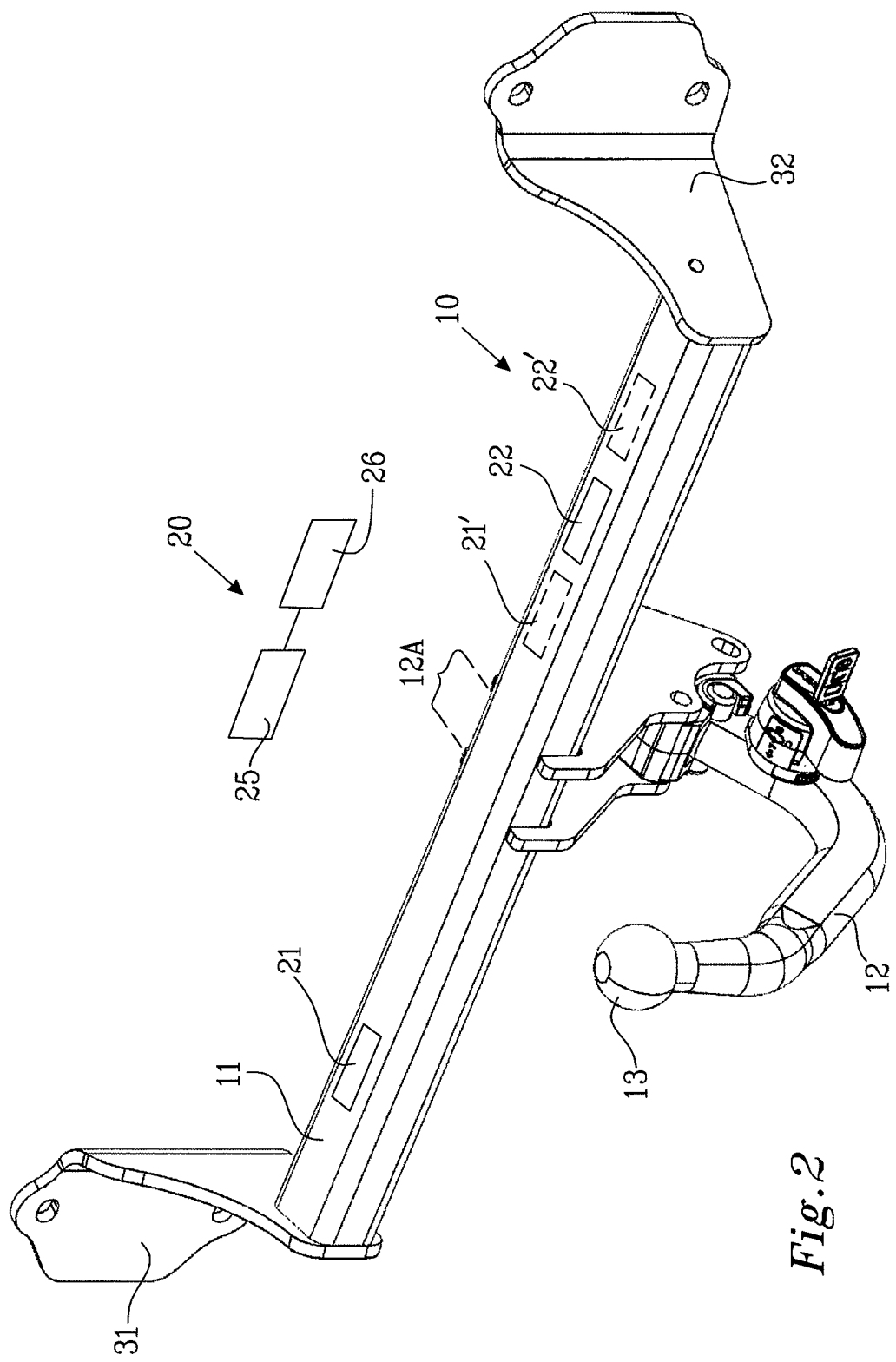
FIG. 2 shows a towing hook arrangement comprising a tow bar and a towing hook, the towing hook being of the detachable type.
Figure 3:
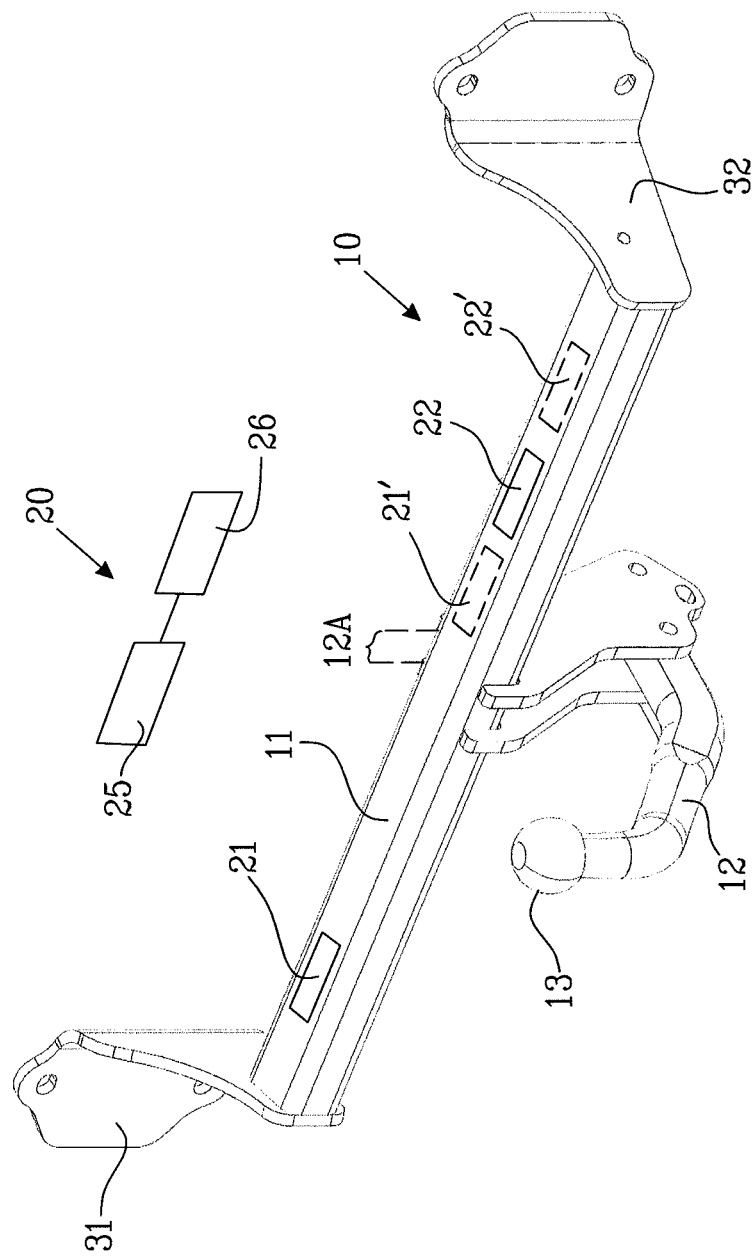
FIG. 3 shows a towing hook arrangement comprising a tow bar and a towing hook, the towing hook being of the fixed type.
Figure 4:
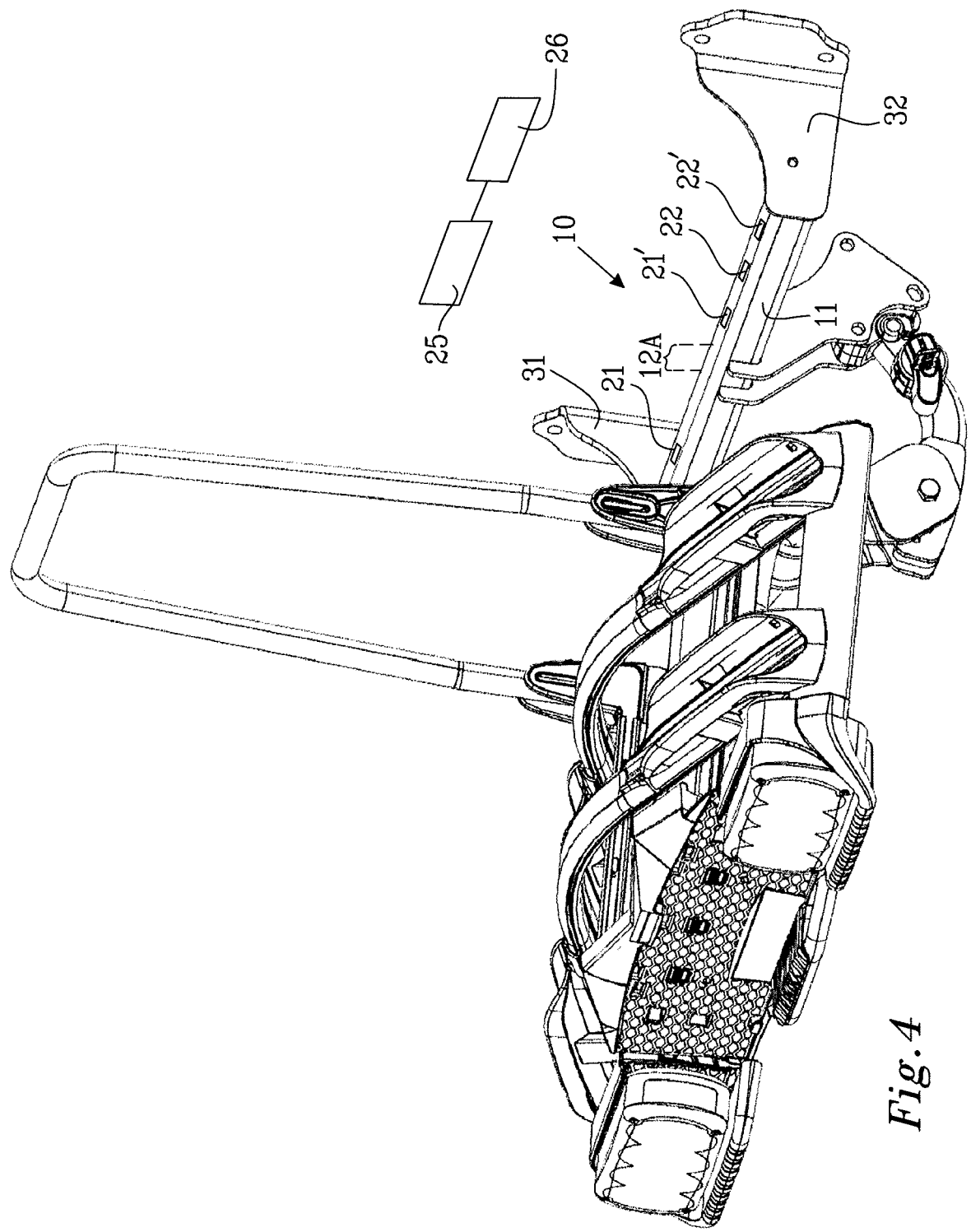
FIG. 4 shows a towing hook arrangement comprising a tow bar and a tow bar accessory, the tow bar accessory being a bicycle carrier.

FIGS. 2-4 illustrates a towing hook arrangements according to embodiments of the present invention in which; FIG. 2 is a towing hook arrangement having a detachable towing hook; FIG. 3 a towing hook arrangement with a fixed towing hook 12. FIG. 4 shows a towing hook arrangement having a tow bar and a tow bar accessory. The tow bar accessory is arranged on the tow bar instead of a towing hook as shown in FIGS. 1-3. As is noticed the tow bar accessory may be arranged to the tow bar via a neck element, but could be coupled directly onto the tow bar itself if desirable. Each one of the towing hook arrangements shown in FIGS. 2-4 may be provided with a sensor arrangement 20 as disclosed herein. The sensor arrangement 20 may be provided with an electronic control unit (ECU) 25 and/or a display unit 26, e.g. as disclosed above.

FIGS. 2-4 further show optional actuator and sensor positions 21, 21', 22, 22'. The actuators and the sensors 21, 21', 22, 22' can be positioned on the same side with respect to the towing hook 12 or the tow bar accessory, and the attachment section 12A, on the tow bar 12 as indicated with the dashed lines. The attachment section 12A is thus not separating the actuator and the sensor 21', 22'. Optionally the actuator and the sensor may be positioned on either side of the attachment section 12A, as indicated by reference 21, 22. Combinations between these configurations are of course possible, i.e. there may be actuators cooperating with sensors on either side of the attachment section 12A, and actuators and sensors cooperating on the same side of the attachment section 12 A simultaneously or intermittently. The ECU 25 and the display unit 26 may communicate with the actuator 21 and/or the sensor 22 as described above.

The tow bar disclosed herein may optionally or additionally be provided with a receiving member having a squared cross section, following the US standard SAE hitch class for example, for receiving a tow bar accessory, or for connection to a towing hook.

Figure 5:
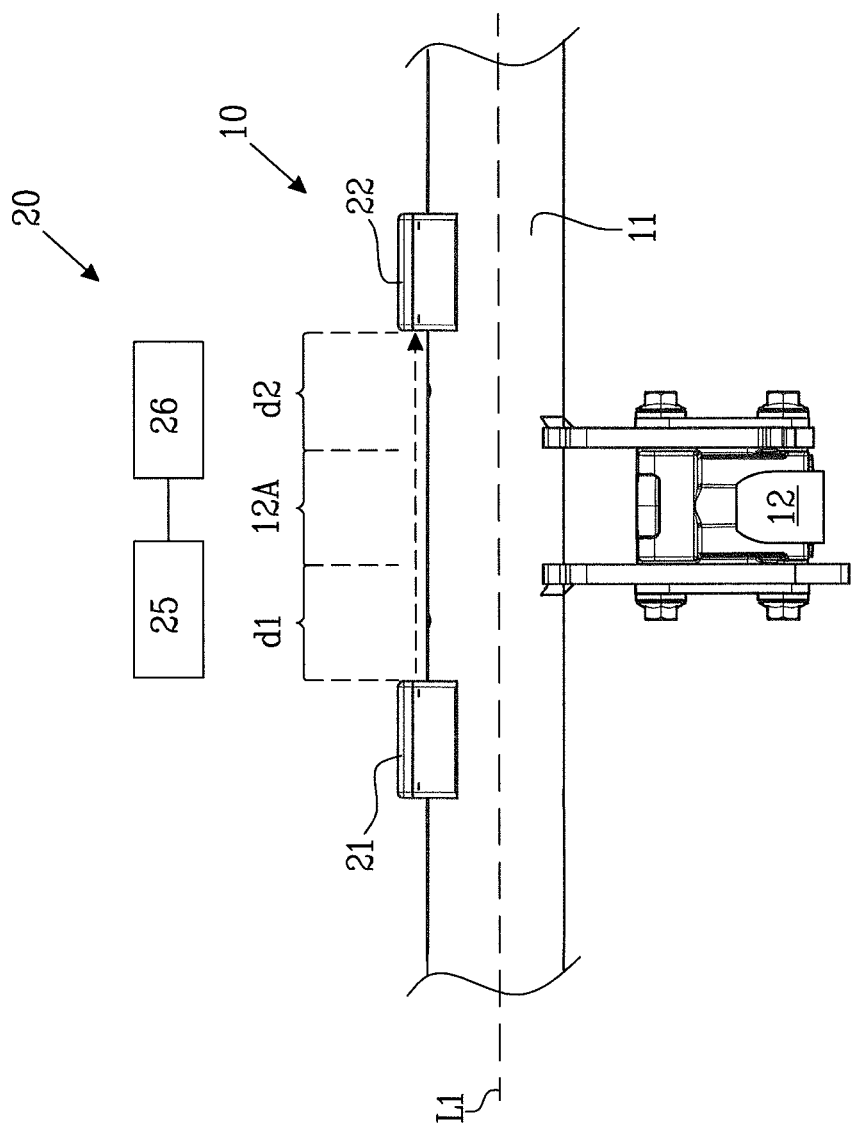
FIG. 5 shows a portion of the tow bar, the actuator and the sensor arranged on the tow bar of FIG. 2 in greater detail with a view along a line perpendicular to the longitudinal line of the tow bar.

Some general aspects of the sensor arrangement will be described in greater detail hereafter. FIG. 5 shows a towing hook arrangement 10 having a detachable towing hook 12. FIG. 5 further shows portions of a tow bar 11, portions of a towing hook 12, a sensor arrangement 20 comprising an actuator 21, a sensor 22. Just like the embodiment shown in FIG. 1, the fixed towing hook 12 is arranged to the tow bar via an attachment section 12A formed in a similar manner by two attachment flanges. An ECU 25 and a display unit 26 are also shown. The ECU may communicate with the actuator 21 and/or the sensor 22 as described above. Although only one actuator and only one sensor is described with respect to FIG. 5, it should be noted of course that the sensor arrangement 20 may be provided with two or more actuators or two or more sensors.

The distance d1, d2 between the actuator 21 and the sensor 22 can be derived as shown in FIG. 5. For example, if the distance d1 is 20 cm, the attachment section 12A is 10 cm and the distance d2 is 20 cm, the actuator 21 and the sensor 22 are separated a distance of 50 cm.

The sensor 22 of the sensor arrangement 20, is preferably arranged directly onto the tow bar 11. The sensor 22 may also be positioned on an opposing side with respect to the side at which the towing hook 12 is attached to the tow bar 12. In the shown embodiment, the actuator 21 and the sensor 22 are arranged on the opposite sides of the attachment section 12A at which the towing hook 12 is attached to the tow bar 11. The tow bar 11 has a longitudinal center line L1 and the actuator 21 and/or the sensor 22 may preferably by arranged on the opposite side of the attachment section 12A at which the towing hook 12 is attached to the tow bar 11 with respect to the longitudinal center line L1 of the tow bar 11.

As it can be gleaned, the towing hook of the towing hook arrangement can be retractable, fixed, removable or operable in other ways. The method for measuring the applied load on the towing hook can advantageously be applied on any towing hook arrangement having a tow bar for supporting a towing hook or a tow bar accessory.

Figure 6:
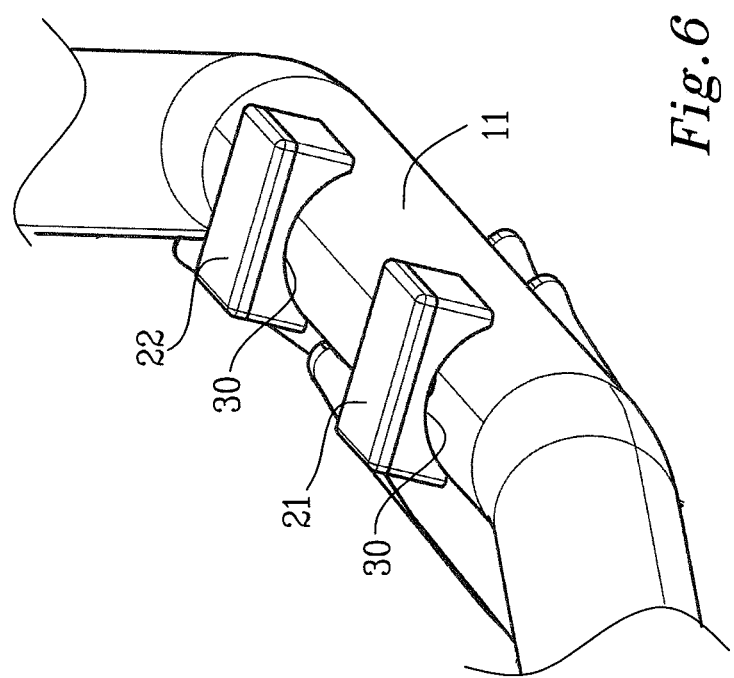
FIG. 6 shows a portion of the tow bar, the actuator and the sensor arranged on the tow bar of FIG. 2 in greater detail with a view in perspective.

FIG. 6 shows a portion of the tow bar 11, the actuator 21 and the sensor 22 of FIG. 5 in greater detail and with a perspective view. As can be gleaned from FIG. 6, the actuator 21 and/or the sensor 22 are arranged to snugly fit the shape of the tow bar 11. In the shown embodiment, the tow bar 11 has a cylindrical shape, with a circular cross section. The actuator 21 and the sensor 22 are provided with a mating portion having a corresponding shape as a portion of the tow bar 11, in this case a substantially arc shaped portion 30.

Generally, the actuator can be clamped, glued, or attached via a snap in connection. The actuator and the sensors are preferably attached via a vibration transferring connection, i.e. a connection which does not dampen the vibration used to measure the imparted load to a too high extent. It is thus preferred with a relatively stiff connection which permits transfer of the propagating frequency waves due to the vibration. As a matter of example, the actuator and/or the sensor may be attached via bolted connection, click connection, adhesive/glue, pressed connection, weld connection, tie or wrap connection, or form locked connection towards tow bar.

The at least one sensor and/or the at least one actuator may be displaced preferably along the tow bar for calibration purposes, i.e. displaceably arranged to the tow bar. The sensor and/or actuator can be positioned in one or more housings for example. Optionally the actuator and/or sensor can be displaceably arranged inside of the housing(s), to permit adjustment or calibration of the sensor arrangement, e.g. via signal from the electronic control unit if such is present.

The actuator(s) and the sensor(s) are preferably aligned with each other. They may advantageously be aligned with a longitudinal axis of the tow bar. It has been found to be advantageous if the cross section of the tow bar is circular, oval, squared, or the like, i.e. symmetrical. The cross section of the tow bar preferably has a constant cross section along a majority of the length, preferably the whole length, between the at least one actuator and the at least one sensor.

It has been found that if a frequency scan or frequency sweep is carried out using the actuator 21, e.g. using a vibration motor, a sudden peak in amplitude will be observed. The observed peak is indicating the location of the first or higher harmonic of the natural frequency (eigenfrequenz) of the system. A change in the first or higher harmonic of the natural frequency was detected when more mass, i.e. a higher load, was applied to the towing hook. It has been found that this is a surprisingly efficient way to detect imparted torque to the tow bar via the applied load on the towing hook.

The actuator 21 can be a vibration motor. A vibration motor can be different in nature but a suitable vibration motor can be a rotational motor, solenoid based vibration motor, Precision Microdrives (PMD) 320-102, Brushless vibration motor, Linear resonant actuator, Shaker-like actuator, Vibration gear motor, Piezo based motor, mechanical excitation mechanism capable of exciting the system in one or more frequencies. In principle any actuator that imparts an impact may be used. One type of rotation motor generally has a rotating element which when rotating imparts the desired vibrations to the tow bar and thus the system. The actuator 21 in the shown embodiments is a rotation motor. The sensor 22 can be a piezo sensor. Generally, the rotation motor starts at a low level e.g. zero revs per minute (RPM) to an upper limit which can be pre determined, e.g. via a selected RPM, imparted power level, or time for example. Hence by going from zero RPM to a high number of RPM, while sampling the piezo signal, the systems first or higher harmonic of the natural frequency peak can be detected. It is of course possible to go from a high number of RPM to zero RPM or to a lower amount of RPM, while sampling the piezo signal. In both ways the systems first or higher harmonic of the natural frequency peak can be detected.

When the sweep was carried out by the vibration motor, i.e. the actuator 21, a pulse width modulation (PWM) was used. The purpose of using a PWM is to more effectively control the vibration motor. Hence in a general aspect, a PWM may be used to control the actuator. The PWM rapidly turns the vibration motor on and off or at least switches it between an active or stand by state. This effectively regulates the voltage acting on the vibration motor. A PWM may thus be used to tune the RPM of the vibration motor.

Figure 7:
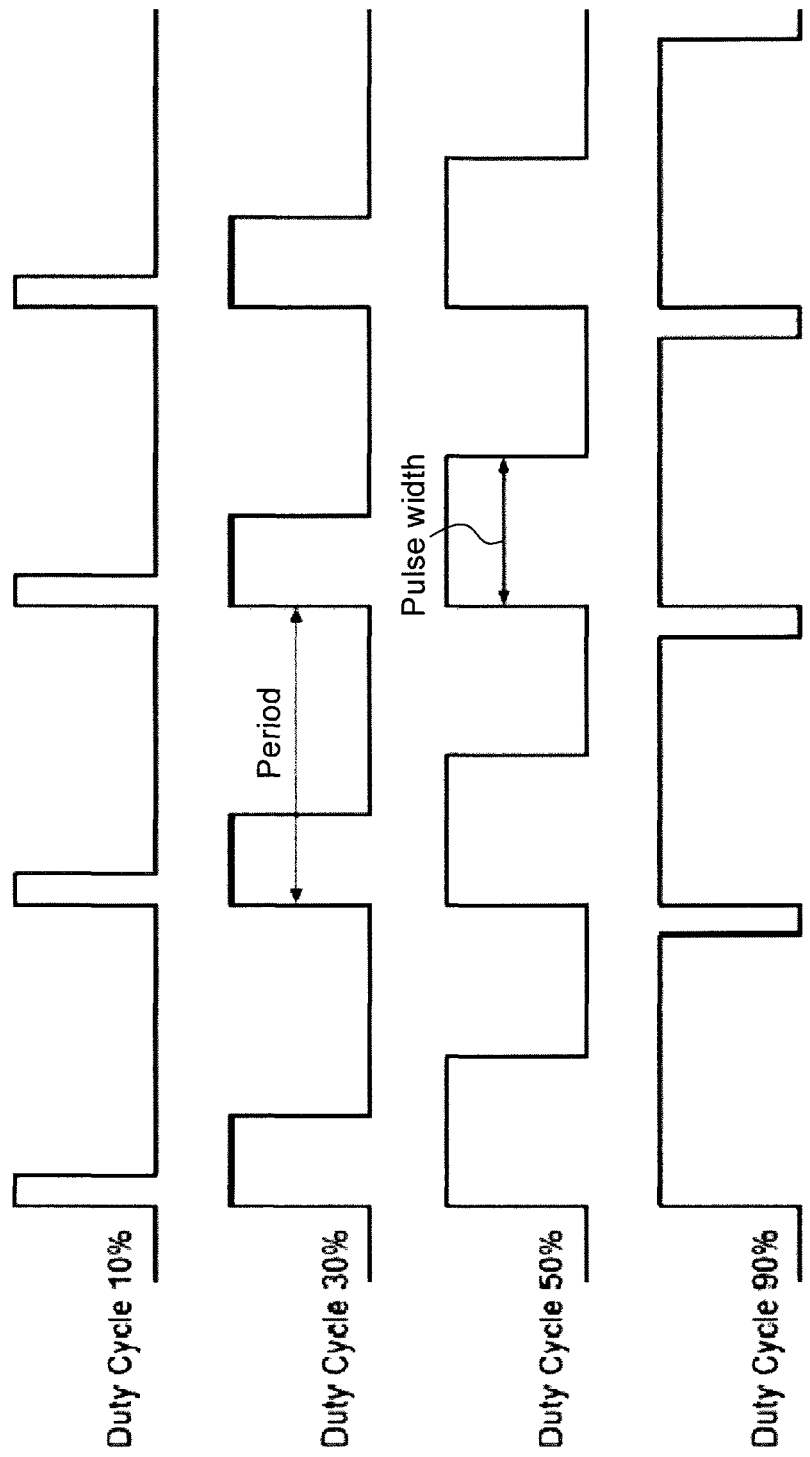
FIG. 7 shows different duty cycles of different pulse width modulations.

FIG. 7 shows different pulse width modulations. By setting the percentage of the duty cycle, the speed of the vibration motor can be controlled. PWM input for the motor was generated. By measuring the percentage of the duty cycle together with current amplitude Root Mean Square (RMS) of the Piezo element, a relation between the applied load and the position of the peak of the first or higher harmonic of the natural frequency of the system can be found. The percentage of the duty cycle can be derived from the correlation:

$$\frac{(\text{pulse width} \times 100)}{\text{period}}$$

The following principle steps can advantageously be carried out to find the first or higher harmonic of the natural frequency of a selected system.

a) Perform a PWM sweep with a selected step size and selected range. Find the PWM duty cycle percentage at which the maximum RMS value is found.
b) Perform a new PWM sweep with a smaller range and step size, around the found maximum RMS value in a).
c) Repeat step b) this until a sufficient level of convergence is found.

Figure 8A:
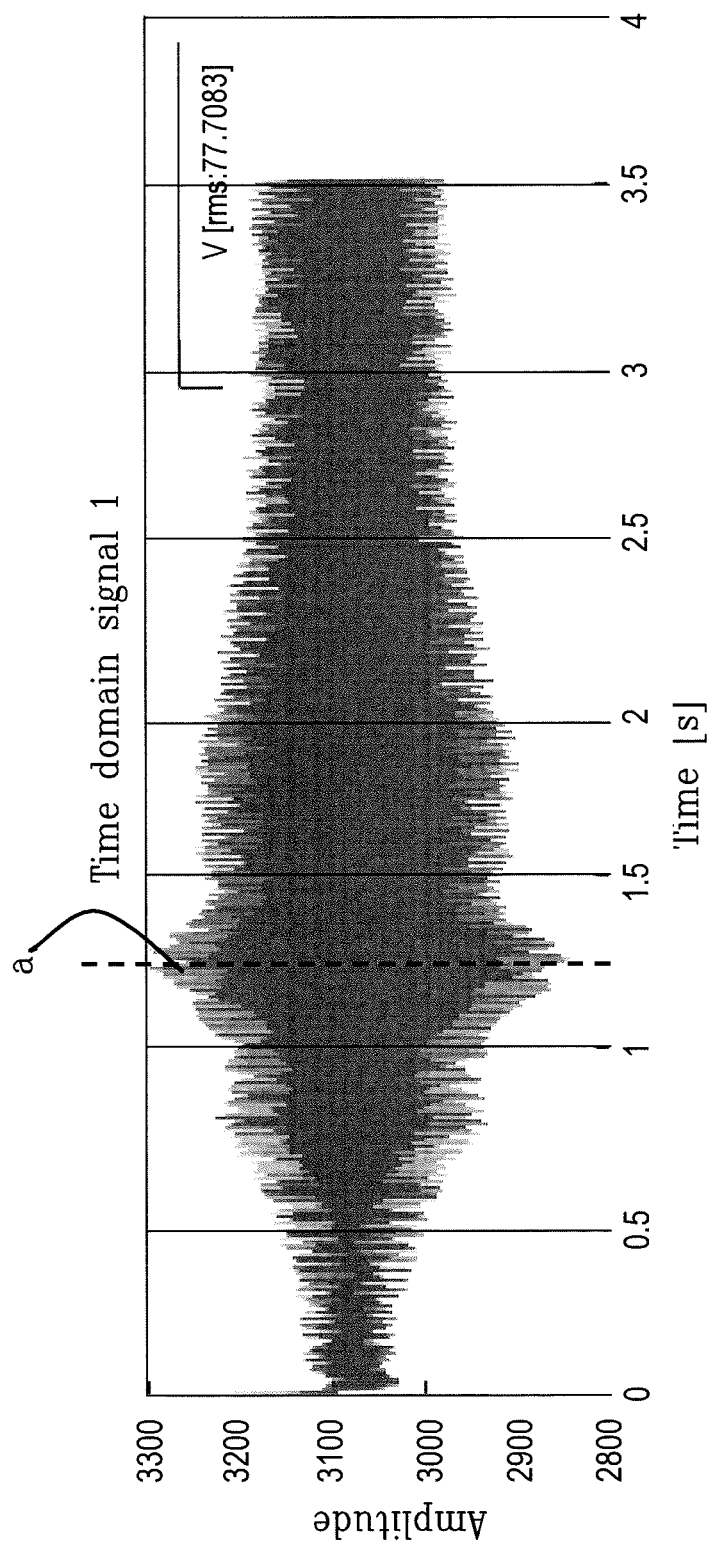
FIG. 8a-8c shows how frequency peaks can be identified and correspond to different loads applied to the towing hook.
Figure 8B:
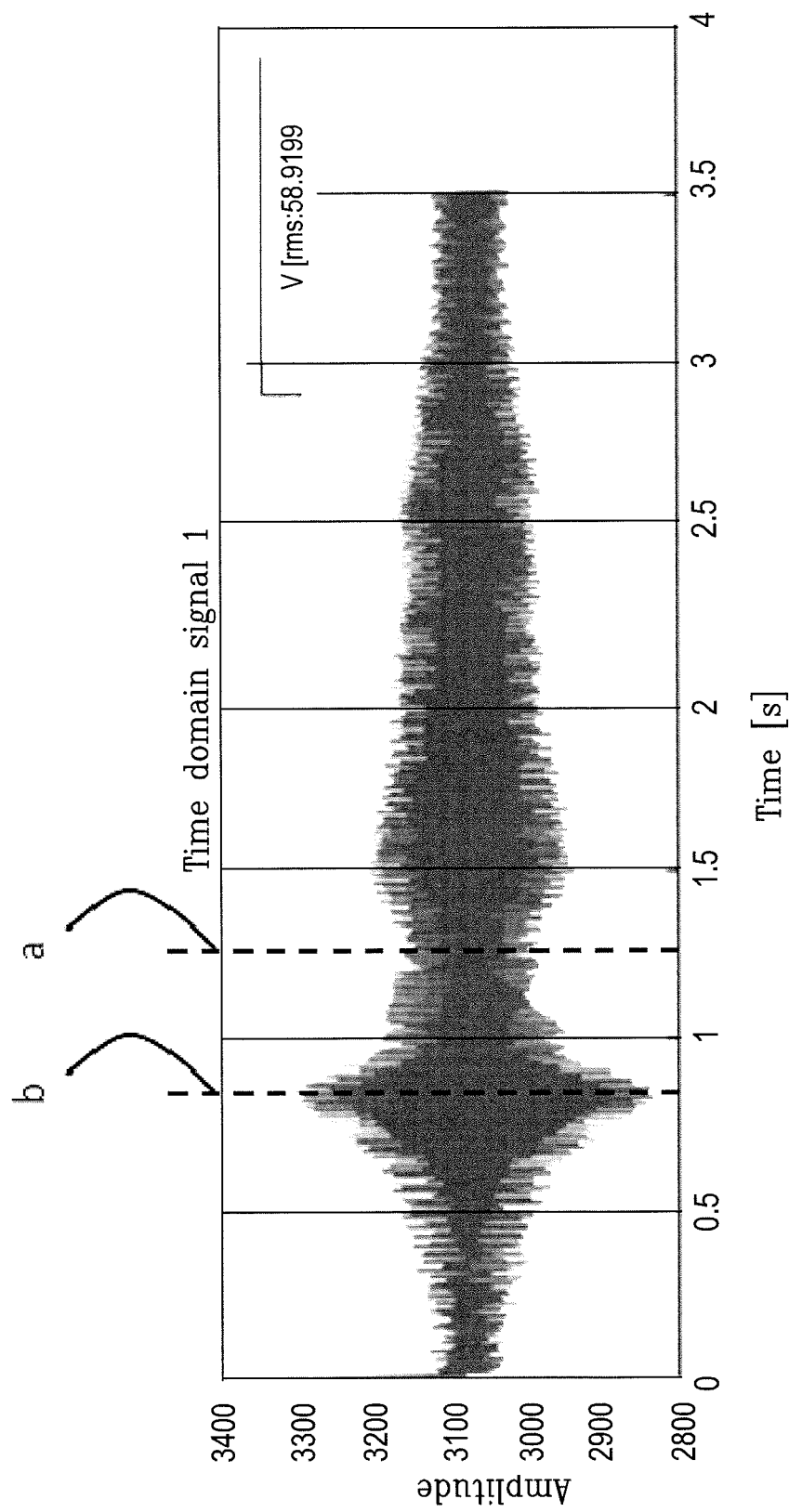
Figure 8C:
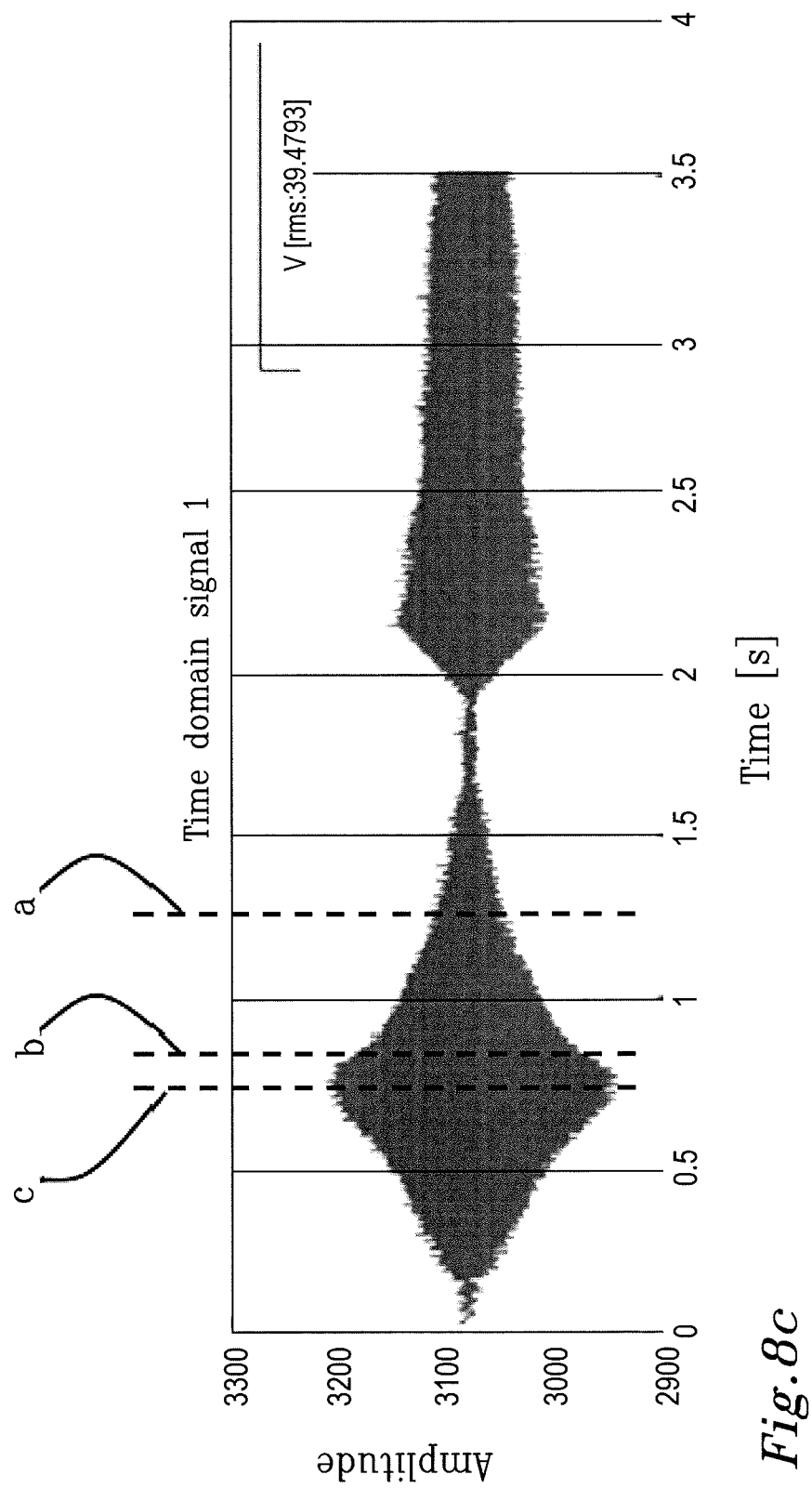

FIGS. 8a-8c shows the amplitude vs Time (s) for different loads applied on the towing hook. FIG. 8a shows the frequency pattern when applying 20 kg of load on the towing hook, FIG. 8b shows the frequency pattern when applying 40 kg of load on the towing hook and FIG. 8c shows the frequency pattern when applying 80 kg of load on the towing hook. In each case the FIGS. 8a-8c shows the results of a single PWM sweep, starting with 0% duty cycle at t=0 and stepwise increasing the PWM signal until 20% duty cycle is reached. As can be seen, the resulting amplitudes detected by the sensor show a peak, which is caused by the first or higher harmonic of the natural frequency of the specific system defined by the different loads on the towing hook.

With reference to FIGS. 8a-8c, the peaks illustrated with dashed lines, a, b, c, can clearly be detected. Referring back to FIGS. 1 and 2 for example, although applicable if desirable to all embodiments disclosed herein, the data collected from the sensor 22 can thus be used to detect changes in the first or higher harmonics of the natural frequency, and determine that a load is applied on the towing hook 12, as well as determine the amount of load applied on the towing hook 12, even when the load working as a torque to the tow bar 11. In FIG. 8c all three peaks a, b, c, are illustrated to show the difference in frequency pattern formed when applying different loads to the towing hook 12.

Figure 9:
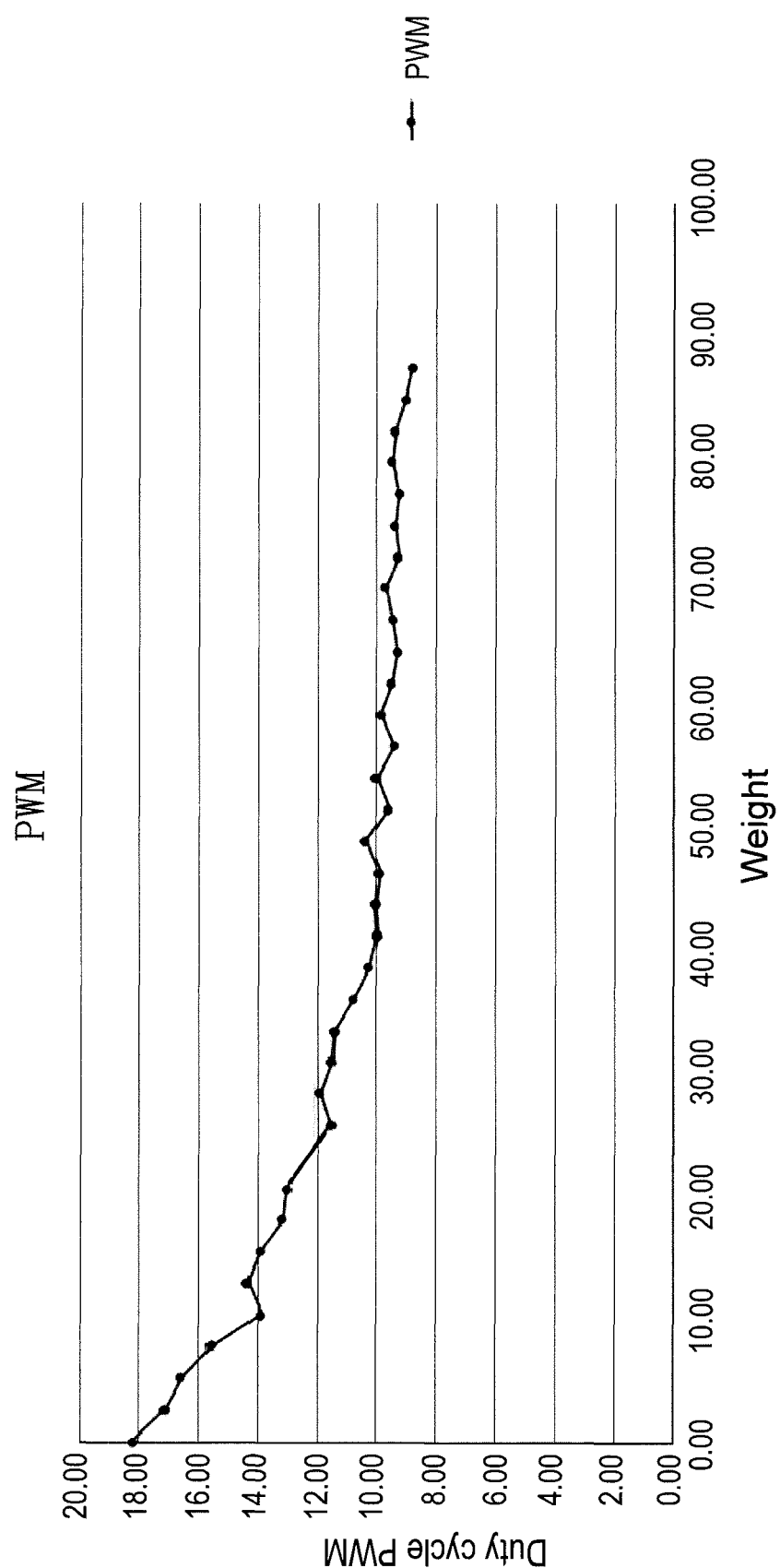
FIG. 9 shows duty cycles percentage PWM plotted against applied load.

FIG. 9 shows the maximum root mean square (RMS) of the signal, i.e. the effective value of the measured signal, plotted against the applied load. FIG. 9 shows the method applied on a wider range of loads applied on the towing hook, increasing the load by 2.55 Kg at each step. At each step, the PWM sweep is carried out, and the PWM duty cycle percentage at which the max RMS value was found is plotted against the load.

As can be gleaned from FIG. 9, there is a direct correlation between the applied load on the towing hook, and the load which the towing hook imparts on the tow bar, which can be detected using the described method without measuring on the towing hook itself.

In general, the method can include one or more of the following steps;

a) imparting the tow bar of a towing hook arrangement with a frequency sweep, preferably within a selected frequency range, via the actuator;

b) via the sensor, detect the first or higher harmonic of the natural frequency of the towing hook arrangement;

c) imparting the tow bar of the towing hook arrangement with a second frequency sweep, preferably within a second frequency range, said second frequency range preferably being different from said first frequency range;

d) optionally repeat the steps a), b) and/or c).

In an embodiment, the method can include one or more of the following steps;

a) selecting a PWM signal to the vibration motor with a selected percentage duty cycle;

b) via the sensor, such as a piezo element and/or piezo sensor, measure the RMS value;

c) adjust the PWM signal duty cycle percentage or a similar parameter giving the same function, e.g. by increasing or decreasing the PWM signal duty cycle percentage;

d) optionally repeat the steps a), b) and/or c).

It should be noted that step d) above, can be performed any number of times.

It has been found that the method disclosed herein is readily applicable on towing hook arrangements and specifically on the tow bar. It can be performed after or before it has been mounted to a vehicle. It is advantageous however if a zero load measurement is performed, as a calibration step, after the towing hook arrangement has been mounted to the intended vehicle. Hence the method may include the step of performing a calibration step after the towing hook arrangement has been mounted to a vehicle, and preferably without a load applied to the towing hook and/or tow bar accessory. The other measurements may thereafter be compared with the measurement received from the calibration step.

It should be noted that the data received, measured, calculated and so forth may be stored locally in the towing hook arrangement, in the vehicle to which the towing hook arrangement is arranged, or remotely such as in a remotely located server or in a cloud based data service. To enable this, the towing hook arrangement, and specifically the ECU as disclosed above, may be provided with a communication unit adapted to communicate with the vehicle or with a remote CPU, server or the like.

According to an aspect, the towing hook arrangement may be provided with at least one electrical socket, hereafter referred to as a socket, for receiving an electrical plug, hereafter referred to as a plug, from a trailer. The socket may be adapted to permit transfer of electrical signals and electricity to electrical components on the towable object, such as lights on a trailer. The towing hook arrangement may be prevented from taking measurements if no plug is attached to the socket of the towing hook arrangement. The towing hook arrangement may be provided with a sensor for detecting if a plug is attached to a socket of the towing hook arrangement. Hence optionally or additionally, no measurements may be made unless the mentioned sensor detects that a plug is attached to the socket of the towing hook arrangement.

Measurements may further be done independently if the vehicle is moving, standing still, idle, standing by or turned off. According to an aspect, measurements may not be performed during heavy acceleration as such acceleration may affect the stress imparted to the tow bar via the vehicle chassis.

The RMS values may be used to detect if e.g. a trailer dampens the imparted vibration. This can be used to form one or more compensational factors, to compensate for the dampening effect the sensor system may be subjected to, e.g. from different types of trailers. The RMS values in combination with the location of the peaks may give an indication of the influence of the damping of the trailer on the system. With lower RMS values a higher damping is expected.

The output signal from the at least one sensor may be filtered. An example of a suitable filter is a low frequency filter (low pass filter). This reduces the high frequency noise which may be detected by the at least one sensors.

The invention claimed is:

1. A method for measuring an applied load on a towing hook and/or a tow bar accessory of a towing hook arrangement for a vehicle, said towing hook arrangement comprising a towing hook and/or a tow bar accessory arranged on a tow bar, said towing hook arrangement comprising a sensor arrangement having at least one actuator and at least one sensor, said method comprising the steps of:
   a) imparting a vibration to said tow bar using said at least one actuator, whereby said at least one actuator is positioned on said tow bar;
   b) detecting the imparted vibration using said at least one sensor arranged on said tow bar; and
   c) using said detected imparted vibration to determine the applied load on said towing hook and/or said tow bar accessory.

2. The method according to claim 1, whereby said method further comprises the step of:
   determining a first or higher harmonic of the natural frequency of said tow hook arrangement, and using said determined first or higher harmonic of the natural frequency of said tow hook arrangement to determine the applied load on said towing hook and/or said tow bar accessory, said determination is preferably done after said towing hook arrangement is mounted to a vehicle.

3. The method according to claim 2, whereby said first or higher harmonic of the natural frequency of said tow hook arrangement is determined by: imparting a vibration to said tow bar when said towing hook and/or said tow bar accessory is load free and; detecting said imparted vibration using said at least one sensor.

4. The method according to claim 1, whereby said tow bar has an attachment section for said towing hook and/or said tow bar accessory arranged between said at least one actuator and at least one sensor, whereby said vibration passes said attachment section before reaching said at least one sensor.

5. The method according to claim 1, wherein said tow bar has an attachment section for said towing hook and/or said tow bar accessory arranged at the side of said at least one actuator and said at least one sensor, whereby said vibration is directed directly towards said at least one sensor for the purpose of not passing said attachment section before reaching said at least one sensor.

6. The method according to claim 1, whereby said at least one actuator in step a) initiates a first frequency scan; and said method further comprises the step of performing a second frequency scan.

7. The method according to claim 6, whereby said second frequency scan is different with respect to said first frequency scan.

8. The method according to claim 6, whereby said frequency scan(s) is/are a frequency sweep.

9. The method according to claim 8, whereby said second frequency sweep is performed with a smaller step size than said first frequency sweep.

10. The method according to claim 8, whereby said second frequency sweep is performed across a smaller frequency range than said first frequency sweep.

11. The method according to claim 6, whereby a first frequency peak is detected from said first frequency scan, and whereby said second frequency scan is performed across said detected first frequency peak.

12. The method according to claim 1, wherein said towing hook arrangement has a towing hook, whereby said towing hook is a retractable towing hook displaceable between a tow position and a retracted storage position, fixed towing hook, detachable towing hook, or a fixed towing hook, whereby said detected imparted vibration is used to determine the applied load on said towing hook.

13. The method according to claim 12, wherein said towing hook is a retractable towing hook, and whereby a vibration is imparted to said tow bar when said towing hook is in said storage position and/or said tow position.

14. The method according to claim 1, wherein said towing hook arrangement has a tow bar accessory, whereby said detected imparted vibration is used to determine the applied load on said tow bar accessory.

15. The method according to claim 1, wherein said towing hook arrangement has a socket for receiving a plug from a trailer, whereby said method further comprises the step of; checking if said socket is in use, and if so, permitting a measurement to be performed, or performing a measurement.

16. The method according to claim 1, wherein said sensor arrangement is adapted to detect or determine a torque imparted to said tow bar.

17. The method according to claim 1, wherein said sensor arrangement is adapted to perform a frequency scan having at least two harmonics of natural frequencies of the towing hook arrangement, such as a frequency scan having at least 2-20 harmonics of natural frequencies of the towing hook arrangement.

18. A towing hook arrangement comprising a towing hook and/or a tow bar accessory and a tow bar connectable to a vehicle, said towing hook and/or a tow bar accessory being attached to said tow bar, a sensor system for detecting an applied load on said towing hook and/or a tow bar accessory, said sensor system comprising at least one actuator positioned on said tow bar and at least one sensor arranged on said tow bar, said at least one actuator being adapted to impart said tow bar with a vibration, and said at least one sensor being adapted to detect said vibration.

19. The towing hook arrangement according to claim 18, wherein said at least one actuator is adapted to impart a vibration to said tow bar having a frequency from 10-2000 Hz.

20. The towing hook arrangement according to claim 18, wherein said imparted vibration corresponds to said towing hook arrangement's first or higher harmonic of the natural frequency.

21. The towing hook arrangement according to claim 18, wherein said tow bar has a longitudinal axis, wherein said towing hook and/or tow bar accessory is arranged between said at least one actuator and said at least one sensor with respect to said longitudinal axis of said tow bar.

22. The towing hook arrangement according to claim 18, wherein said tow bar has a longitudinal axis, wherein said towing hook and/or tow bar accessory is arranged to said tow bar at an attachment section, and wherein said attachment section is arranged at the side of, or between, said at least one actuator and at least one sensor with respect to said longitudinal axis of said tow bar.

23. The towing hook arrangement according to claim claim 18, wherein said tow bar has a longitudinal axis, said at least one actuator and said at least one sensor are aligned to each other and with respect to said longitudinal axis of said tow bar.

24. The towing hook arrangement according to claim 18, wherein said at least one actuator has a main plane along which said vibration is imparted to said tow bar preferably as a propagating wave, and in that said at least on sensor is parallel with respect to said main plane, preferably aligned with respect to said main plane.

25. The towing hook arrangement according to claim 18, wherein said at least one actuator and said at least one sensor are aligned in a plane, optionally said plane may intersect with a longitudinal centre axis of the tow bar or be aligned with the periphery of the cross section of the tow bar.

26. The towing hook arrangement according to claim 18, wherein said at least one actuator and/or said at least one sensor is arranged on the surface of the tow bar, and/or on the inside of the tow bar.

27. The towing hook arrangement according to claim 18, wherein said towing hook and/or said tow bar accessory is attached to said tow bar at an attachment section, and wherein the distance from said attachment section to said at least one actuator and/or said at least one sensor is from 2-100 cm.

28. The towing hook arrangement according to claim 18, wherein said towing arrangement has at least one attachment point to said vehicle, wherein said at least one actuator and said at least one sensor is at least 10 cm from said at least one attachment point.

29. The towing hook arrangement according to claim 18, wherein said towing arrangement has a first and a second attachment point to said vehicle, wherein said at least one actuator and at least one sensor is at least 10 cm from said first and said second attachment points.

30. The towing hook arrangement according to claim 18, wherein the distance between said at least one actuator and said at least one sensor is from 2-200 cm.

31. The towing hook arrangement according to claim 18, wherein said at least one actuator is at least one vibration motor, preferably a rotation motor or a solenoid motor.

32. The towing hook arrangement according to claim 18, wherein said towing hook arrangement further comprises an electronic control unit and optionally a display unit.

33. The towing hook arrangement according to claim 18, wherein said towing hook arrangement has a towing hook, wherein said towing hook is a retractable towing hook, said retractable towing hook is displaceable between a tow position and a retracted storage position, a fixed towing hook, or a detachable towing hook.

34. The towing hook arrangement according to claim 18, wherein said sensor arrangement is adapted to detect or determine a torque imparted to said tow bar.

35. The towing hook arrangement according to claim 18, wherein at least one additional sensor is arranged on said towing hook and/or said tow bar accessory, preferably on the neck of said towing hook.

36. The towing hook arrangement according to claim 18, wherein said tow bar comprises one or more temperature sensors, said one or more temperature sensor preferably being positioned so that they measure the temperature between the at least one actuator and the at least one sensor, or at the proximity of said at least one sensors.

37. The towing hook arrangement according to claim 18, wherein said at least one actuator and said at least one sensor are arranged on said tow bar, and preferably said tow bar is made from one unitary piece of material.

* * * * *